US012579662B2

(12) United States Patent
Shevelev et al.

(10) Patent No.: US 12,579,662 B2
(45) Date of Patent: Mar. 17, 2026

(54) HIGH-PRECISION LOCALIZATION OF A MOVING OBJECT ON A TRAJECTORY

(71) Applicant: Oracle International Corporation, Redwood Shores, CA (US)

(72) Inventors: Oleg Gennadievich Shevelev, Chislehurst (GB); Sahil Malhotra, Hampton (GB); Sergio Aldea Lopez, Valladolid (ES); Matthew Charles Rowe, Milton Keynes (GB); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 18/210,506

(22) Filed: Jun. 15, 2023

(65) Prior Publication Data

US 2024/0420343 A1 Dec. 19, 2024

(51) Int. Cl.
*G06K 9/00* (2022.01)
*G06T 7/246* (2017.01)
*G06T 7/70* (2017.01)

(52) U.S. Cl.
CPC ................ *G06T 7/248* (2017.01); *G06T 7/70* (2017.01); *G06T 2207/20084* (2013.01); *G06T 2207/30241* (2013.01)

(58) Field of Classification Search
CPC . G06T 2207/20081; G06T 2207/20084; G06T 2207/30241; G06T 2207/30244;
(Continued)

(56) References Cited

U.S. PATENT DOCUMENTS

| | | | | |
|---|---|---|---|---|
| 6,169,952 | B1 | 1/2001 | Matsuda | |
| 11,600,017 | B2 * | 3/2023 | Chidlovskii | ............ G06T 3/147 |

(Continued)

FOREIGN PATENT DOCUMENTS

| | | |
|---|---|---|
| CN | 114549661 | 5/2022 |
| EP | 2821751 A1 | 1/2015 |

(Continued)

OTHER PUBLICATIONS

En, Sovann, Alexis Lechervy, and Frederic Jurie. "Rpnet: An end-to-end network for relative camera pose estimation." Proceedings of the European Conference on Computer Vision (ECCV) Workshops. 2018. (Year: 2018).*

(Continued)

*Primary Examiner* — Hadi Akhavannik
(74) *Attorney, Agent, or Firm* — Hickman Becker Bingham Ledesma LLP

(57) ABSTRACT

Techniques for generating high-precision localization of a moving object on a trajectory are provided. In one technique, a particular image that is associated with a moving object is identified. A set of candidate images is selected from a plurality of images that were used to train a neural network. For each candidate image in the set of candidate images: (1) output from the neural network is generated based on inputting the particular image and said each candidate image to the neural network; (2) a predicted position of the particular image is determined based on the output and a position that is associated with said each candidate image; and (3) the predicted position is added to a set of predicted positions. The set of predicted positions is aggregated to generate an aggregated position for the particular image.

20 Claims, 5 Drawing Sheets

(58) Field of Classification Search
CPC . G06T 2207/30248; G06T 7/248; G06T 7/70;
G06T 7/74
See application file for complete search history.

(56) References Cited

U.S. PATENT DOCUMENTS

| | | | |
|---|---|---|---|
| 12,051,283 | B1 | 7/2024 | Gataric |
| 2008/0275602 | A1 | 11/2008 | Peake |
| 2011/0153267 | A1 | 6/2011 | Peeters |
| 2018/0236937 | A1 | 8/2018 | Utter |
| 2019/0147221 | A1* | 5/2019 | Grabner .................... G06T 7/75 |
| | | | 382/103 |
| 2020/0302634 | A1* | 9/2020 | Pollefeys ................. G06T 7/70 |
| 2022/0097714 | A1 | 3/2022 | Reshef |
| 2022/0319047 | A1 | 10/2022 | Urtasun et al. |
| 2022/0343601 | A1* | 10/2022 | Liaudanskas ........ G06V 10/774 |
| 2023/0135242 | A1 | 5/2023 | Ito |

FOREIGN PATENT DOCUMENTS

| | | |
|---|---|---|
| WO | WO-2018067473 A1 | 4/2018 |
| WO | WO2020/0182297 | 9/2020 |

OTHER PUBLICATIONS

Vishal, Kumar, C. V. Jawahar, and Visesh Chari. "Accurate localization by fusing images and GPS signals." Proceedings of the IEEE Conference on Computer Vision and Pattern Recognition Workshops. 2015. (Year: 2016).*

Parque et al., "Smooth Curve Fitting of Mobile Robot Trajectories Using Differential Evolution", IEEE Access, IEEE, USA, vol. 8, Apr. 28, 2020, pp. 82855-82866.

Li et al., "Rollover-Free Path Planning for Off-Road Autonomous Driving", Electronics, vol. 8, No. 6, May 31, 2019. 22 pages.

Kothe, "Reliable Low-Level Image Analysis", Sep. 21, 2007, pp. 1-318; available: URL:https://hci.iwr.uni-heidelberg.de/system/files/private/downloads/687822792/koethe_08_reliable-image-analysis.pdf.

Hery et al., "Map-based Curvilinear Coordinates for Autonomous Vehicles", 2017 IEEE 20th International Conference on Intelligent Transportation Systems, Oct. 16, 2017, pp. 1-7, XP033330435.

Li, Shaosong, et al. "Dynamic trajectory planning and tracking for autonomous vehicle with obstacle avoidance based on model predictive control." Ieee Access 7 (2019): 132074-132086. (Year: 2019).

Artuliedo, Antonio et al., "Jerk-limited time-optimal speed planning for arbitrary paths." IEEE Transactions on Intelligent Transportation Systems 23.7: 8194-8208. (Year: 2021).

* cited by examiner

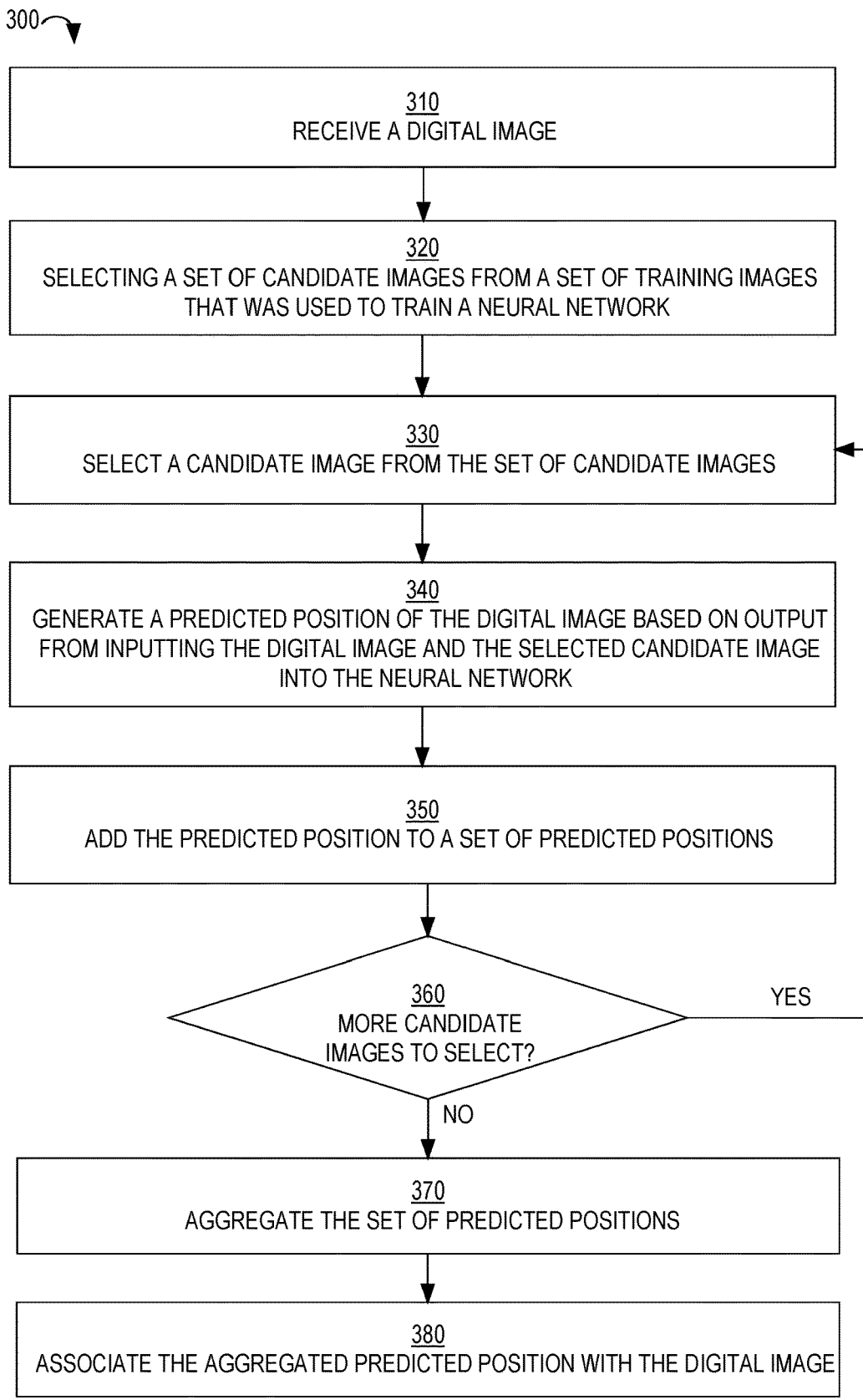

300

310
RECEIVE A DIGITAL IMAGE

320
SELECTING A SET OF CANDIDATE IMAGES FROM A SET OF TRAINING IMAGES THAT WAS USED TO TRAIN A NEURAL NETWORK

330
SELECT A CANDIDATE IMAGE FROM THE SET OF CANDIDATE IMAGES

340
GENERATE A PREDICTED POSITION OF THE DIGITAL IMAGE BASED ON OUTPUT FROM INPUTTING THE DIGITAL IMAGE AND THE SELECTED CANDIDATE IMAGE INTO THE NEURAL NETWORK

350
ADD THE PREDICTED POSITION TO A SET OF PREDICTED POSITIONS

360
MORE CANDIDATE IMAGES TO SELECT?

YES

NO

370
AGGREGATE THE SET OF PREDICTED POSITIONS

380
ASSOCIATE THE AGGREGATED PREDICTED POSITION WITH THE DIGITAL IMAGE

Figure 5:
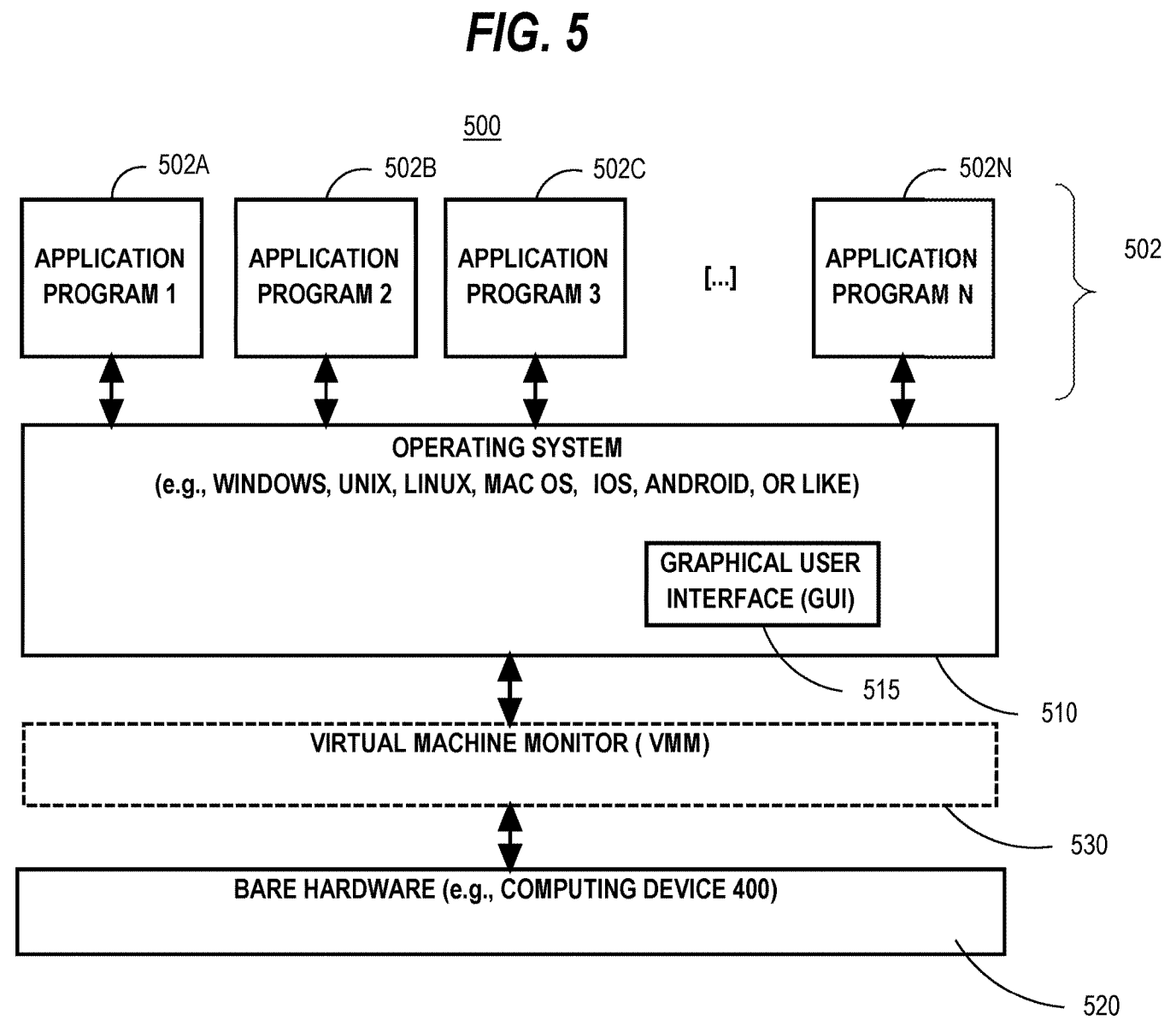

502A APPLICATION PROGRAM 1

502B APPLICATION PROGRAM 2

502C APPLICATION PROGRAM 3

[...]

502N APPLICATION PROGRAM N

510 OPERATING SYSTEM (e.g., WINDOWS, UNIX, LINUX, MAC OS, IOS, ANDROID, OR LIKE)

515 GRAPHICAL USER INTERFACE (GUI)

530 VIRTUAL MACHINE MONITOR (VMM)

520 BARE HARDWARE (e.g., COMPUTING DEVICE 400)

HIGH-PRECISION LOCALIZATION OF A MOVING OBJECT ON A TRAJECTORY

TECHNICAL FIELD

The present disclosure relates to object localization and, more particularly, to using machine learning to obtain high precision localization in well-known environments.

BACKGROUND

Various applications require a solution to determine the position of a moving object in a new environment using a camera mounted on the moving object. Examples of such applications include autonomous navigation for drones, robots and self-driving cars, trajectory analysis for vehicles, augmented reality, and survey, and mapping in GPS-denied environments.

Traditional approaches use mapping and localization-based methods to determine positions of a moving object. However, such approaches are prone to errors in both the mapping and localization steps, which lead to poor positioning accuracy. These errors come from two sources: visual feature engineering and feature sparseness. Regarding the former, visual features (e.g., elements of landscapes) are not able to describe all environments perfectly. If proper image features are not selected, then accuracy for both mapping and localization will suffer. Regarding the latter (feature sparseness), even if appropriate visual features are chosen, only a few features will be present in each image. This sparseness directly affects localization accuracy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts an example process for predicting a position of a moving object, in an embodiment;

FIG. 5 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A system and method for predicting positions of a moving object are provided. In one technique, a set of reference images with known positions is stored and used to train a neural network. Then, given an image that is not associated with a position, a set of candidate images from the set of reference images is selected. For each candidate image in the set of candidate images, that image and the given image are input to the neural network, which outputs a predicted position of the given image. The predicted positions are aggregated to generate a final predicted position for the moving object at a time corresponding to the given image.

Embodiments improve computer-related technology, namely localization technology. Because the calculated positions of a moving object are anchored to the exact positions of the candidate images, no drift occurs in the localization system, which is typical to many SLAM systems. Another improvement is that, with embodiments, the localization system can robustly maintain correct localization for long trajectories extending over great distances, such as several kilometers.

SYSTEM OVERVIEW

Figure 1:
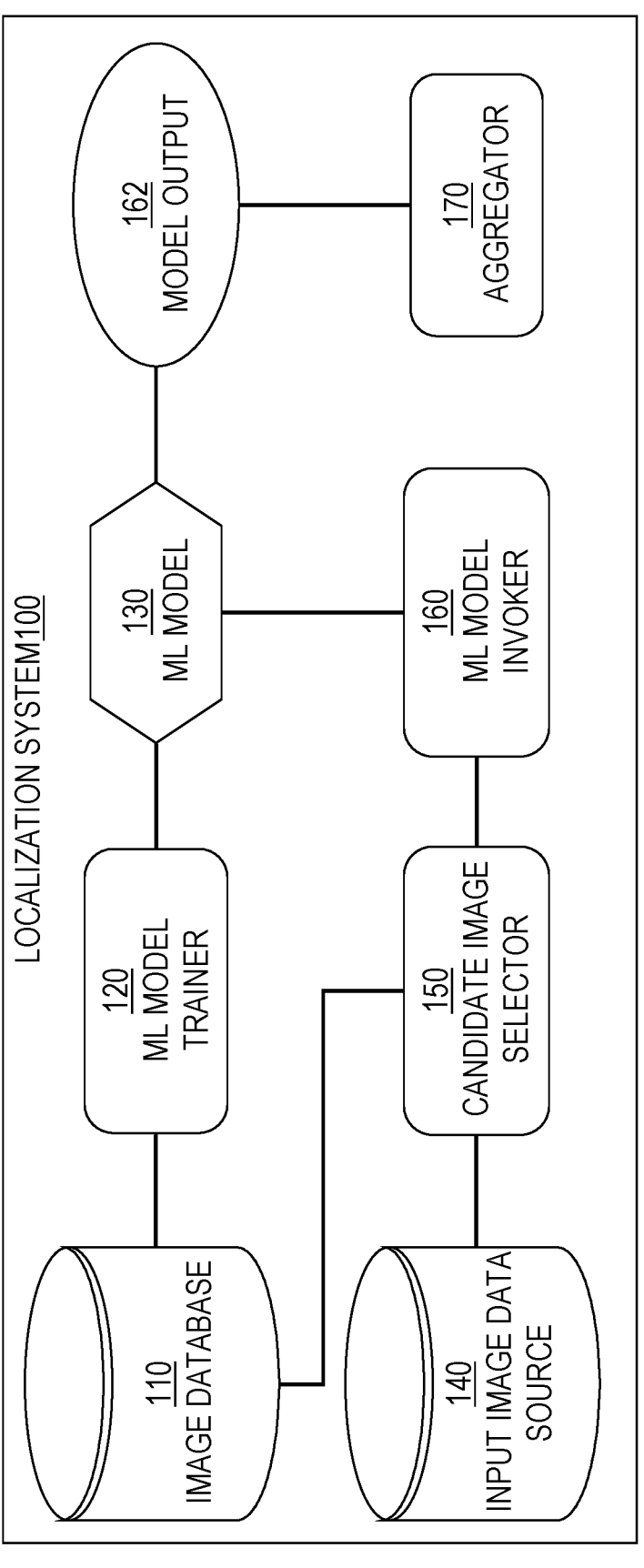
FIG. 1 is a block diagram that depicts an example localization system, in an embodiment.

FIG. 1 is a block diagram that depicts an example localization system 100, in an embodiment. Localization system 100 includes an image database 110, a machine learning (ML) model trainer 120, a machine-learned (ML) model 130, input image data source 140, candidate image selector 150, an ML model invoker 160, model output 162, and aggregator 170. Each of ML model trainer 120, candidate image selector 150, ML model invoker 160, and aggregator 170 may be implemented in software, hardware, or any combination of software and hardware.

Image database 110 includes sets of images (or "images sets"), each image set corresponding to a different video footage or video stream. For example, one or more moving objects, such as cars, airplanes, robots, drones, etc., have a digital camera that generates images (or a video stream) and a position determining component that determines a position of the moving object at each time interval, such as every 50 milliseconds, and yaw angle. If the moving object is moving in 3D space (e.g., a flying drone), then the position determining component also determines a pitch and roll of the moving object. (Hereafter, wherever position is mentioned, yaw angle is included although not necessarily specifically mentioned.) The position determining component is matched to the generated images based on time in order to determine a time (or timestamp) for each image.

Multiple image sets are needed in order to generalize ML model 130 to enable variation in actual digital images that will be used when invoking ML model 130. The same moving object may be used to generate multiple sets of images. For example, a drone may be flown from point A to point B multiple times. Additionally or alternatively, multiple moving objects may be used to generate multiple sets of images. For example, multiple race cars may be driven from point A to point B one or more times. When different multiple image sets are used, the moving object(s) may be instructed to start generating images at slightly different locations and move laterally and/or vertically within a defined range. This will allow future moving objects that will rely on ML model 130 to also be able to move within the same range and have an accurate understanding of their absolute positions in three- or two-dimensional space.

In an embodiment, one or more images in a set of images are modified to simulate alternative weather and/or lighting conditions. For example, video footage taken during the day may be input to a filter that darkens images in the video footage that simulate what the recorded environment might look like at sundown or dusk. As another example, video footage taken during clear blue skies may be input to a filter that adds simulated clouds, rain, and/or fog to the video footage. In these ways, if, during a localization session of a moving object, the recorded environment includes rain or poor lighting conditions, then the simulated video footages may be used to properly locate the moving object.

In an embodiment, the sets of images include image sets corresponding to video footages of objects moving in different directions. For example, image database 110 stores (1) first image sets of one or more objects moving from point A to point B and (2) second image sets of one or more objects moving from point B to point A.

If image database 110 includes images sets of varying angles, then the number of images sets required to train ML model 130 (and achieve a certain level of accuracy and utility) may be reduced relative to the number of image sets required if the image sets had less variation.

Model Training

ML model trainer 120 trains ML model 130 based on images in image database 110 using one or more machine learning techniques. ML model 130 may be any type of model, an example of which is an extended optical flow neural network. Examples of such a neural network include FlowNetS, FlowNet2C, FlowNet2SD. Such a neural network is trained by showing the neural network images in pairs. As indicated herein, these images are captured from a known environment, with camera position information (CPI) recorded with the images. CPI includes yaw, pitch, and roll. CPI may be recorded by use of external sensors, such as GPS (global positioning system), INS (inertial navigation system), or RTK (real-time kinematic positioning). Alternatively, CPI is generated offline using techniques such as DGPS (differential GPS), PPK (post-processed kinematic), or SFM (structure from motion). The images may be captured at different points of time, in different lighting and weather conditions, and using different cameras.

In an embodiment, the architecture of ML model 130 is based on a pre-defined or "off-the-shelf." For example, the number of layers and number of neurons per layer is pre-defined, along with at least some of the weights connecting neurons. However, during the training process, ML model trainer 120 modifies those weights, such as through backpropagation. Also, the last layer of the model architecture is changed to be able to predict multiple values, such as longitudinal distance(s), lateral distance (d), and the angle of the camera.

Each image that is used to train ML model 130 is associated with a position. The position may be an absolute location in space, such as a GPS location with latitude and longitude coordinates. Alternatively, the position may be a relative position that is relative to a fixed geographic position, such as a start position on a racetrack. Alternatively, the position may be a position whose measurements are only relevant to a known environment, such as a distance, along an arc, from a start position and a distance from the arc, where the arc defines an accepted path of movement for a moving object whose position is being determined. In addition to positional coordinates (whether $(x, y)$ or $(s, d)$), each image is associated with an angle of the camera with respect to a given reference plane. This is important because embodiments predict an angle of the moving object, which is used to describe the state of the moving object in its physical environment. Two moving objects may be in the same physical position (at different times) but pointing in very different directions. Therefore, the angle is important for calculating localization.

The training data of ML model 130 comprises multiple training instances, each training instance comprising a pair of images (from image database 110) with known positions. The pair of images may be selected based on their distance relative to each other. For example, if two images are within a threshold distance of each other, then those two images are added as a pair for training purposes. Thus, a single image may be included in many pairs that are used to train ML model 130.

In a related embodiment, the images in each pair of images that is used to train ML model 130 are from different video footages, which will likely have at least slightly different trajectories. For example, a first video footage may be along the left boundary of a track (or accepted path of movement), a second video footage may be along the right boundary of the track, and a third video footage may be along the center of the track. Thus, given an image pair {v1, v2} that is used to train ML model 130, v1 and v2 are from different video footages (and, thus, different trajectories) relative to each other.

ML model 130 is trained to "learn" a physical distance between two images and a difference in angles, where the position and angle of one of the images is known and the position and angle of the other image is not known. During training, because the positions of both images are known and, therefore, the difference in positions is known, ML model trainer 120 uses the output of a pre-trained version of ML model 130 to output a distance (i.e., a "guess") and compare that distance with the known difference. ML model trainer 120 uses the result of the comparison to modify the weights of ML model 130, such as weights that are associated with different neurons in a neural network. The larger the result of a comparison, the greater the modification of the weights. Thus, if the result of a comparison is 0, then ML model trainer 120 might not modify any weights.

Once trained, ML model 130 processes image pairs and predicts a spatial correlation (or "displacement") between the positions from which the image pairs were taken. This spatial correlation may be in the form of (a) a 3D or 2D transformation or (b) a custom correlation, such as the difference along a custom axis and an angle of rotation. Subsequently, this spatial correlation is converted to a relative position. Estimating relative positions tends to perform better than estimating absolute positions, which tend to suffer from drift. An example spatial correlation or displacement is a set of three values: s, d, and, where s is a longitudinal distance along a curve or pre-defined path, d is a lateral distance from the curve, and v is an angle of view.

In a related embodiment, although ML model 130 may output a displacement that is subsequently added to a known relative position to generate a predicted relative position, that predicted relative position may be converted to an absolute position, such as GPS coordinates. Such conversion may be useful when working with kinematic equations later. For example, ML model 130 is used to predict a relative position along a trajectory, the relative position is converted to GPS coordinates, which are input to another model.

If the camera position of a first image in an image pair is known, then the camera position of a second image in the image pair may become known automatically, or at least predicted automatically. This is done by combining (a) the position of the "known image" (which is an image with a known position) with (b) the predicted, spatial correlation (e.g., $\hat{\Delta}s_{ij}$, $\hat{\Delta}d_{ij}$, $\hat{\Delta}\psi_{ij}$) to obtain the position of the unknown image (which is an image with an unknown position). Using various images (or "frames") with known positions to calculate the position of the unknown image, embodiments achieves an accuracy of a few centimeters (<10) even when the images are captured at speeds as high as 300 km/h (83 m/s) or more and from 30 FPS footage (over 2.5 m movement per frame at maximum speed).

Inference Time

Input image data source 140 is a source of input images for which a predicted position is computing using ML model 130. Input image data source 140 may be a digital camera that is mounted on a moving object for which a localization session is being conducted. Alternatively, input image data source 140 may be storage that is local relative to candidate image selector 150 that stores images that are streamed from the digital camera. Thus, while candidate image selector 150 retrieves and processes a first digital image from input image data source 140, additional images are being stored (or uploaded) to input image data source 140, where the additional images are from the same input data stream. For example, a wireless connection may exist between input image data source 140 and the digital camera that is generating the images that are stored into input image data source 140.

Candidate image selector 150 retrieves an input image from input image data source 140 and determines an estimated position of the input image. An estimated position of an input image may be determined in one of multiple ways. If the input image is the first image in a video stream, then it may be presumed that the moving object began at a start position, which is associated with position data that is in the same units as the position data associated with training images that were used to train ML model 130, such as GPS coordinates (which is an example of absolute positions) or {s, d} positions (which is an example of relative positions). If the start position is unknown but it is known that the first image is somewhere on a known area or space of object traversal (e.g., a racetrack), then that first image may be compared to all images in a bank of images (e.g., image database 110) and the position of the most similar image is used as the start position.

If the input image is not the first image in a video stream, then the estimated position of the input image is based on the predicted position of each of one or more previous input images, or images that were received/processed prior to the current input image. The estimated position may then be an extrapolation from the previous predicted position(s). For example, the predicted positions of v1 and v2 are used to determine an estimated position of v3 (a current input image), presuming that v3 is on the same line as v1 and v2. The estimated position may also be based on a speed or velocity that is determined for the moving object. The speed may be computed, for example, by dividing (a) the difference of the predicted locations of the last two images by (b) the time difference between the last two images. The speed of the moving object may be helpful in scenarios where the moving object is accelerating or decelerating. An accurate estimate position of a moving object is useful when selecting an appropriate set of candidate images that will be input to ML model 130.

Candidate Image Selection

Given an estimated position of an input image, candidate image selector 150 selects a set of candidate images based on the estimated position. The set of candidate images are from the same set of images that were used to train ML model 130. Thus, the set of candidate images is from image database 110 and is a strict subset of the set of images that was used to train ML model 130. Thus, the images in image database 110 are not only training images for training ML model 130, but also act as reference images. The set of candidate images that is selected is based on the known positions of the candidate images in that set. The closer the position of an image is to the estimated position, the more likely candidate image selector 150 will select that image as a candidate image.

Candidate image selector 150 may employ a threshold distance value in selecting the set of candidate images. For example, if an image in image database 110 is associated with a position that is within the threshold distance of the estimated position, then candidate image selector 150 adds that image to a set of candidate images (that is initially empty).

Additionally or alternatively, candidate image selector 150 employs a threshold number, such that candidate image selector 150 selects a number of candidate images that is equal to the threshold number. For example, if the threshold number is seven, then candidate image selector 150 selects the seven images (in image database 110) whose known positions are closest to the estimated position of the input image.

As another example, candidate image selector 150 identifies all images (in image database 110) whose known positions are within a threshold distance of the estimated position of the input image. If the number of identified images is greater than the threshold number, then candidate image selector 150 removes one or more images from the identified images until the number of the remaining images equals the threshold number. The removed images may be images whose known positions are the farthest from the estimated position compared to the positions of the remaining images. Alternatively, the removed images may be chosen randomly.

If the number of identified images that are within the threshold distance is less than a threshold number (e.g., 1), then candidate image selector 150 increases the threshold distance (at least for this input image and not necessarily for subsequent input images) and then identifies zero or more additional images. If one or more additional images are identified as a result of the increase in the threshold distance, then candidate image selector 150 determines whether the total number of identified images equals the threshold number. If so, then the process stops with respect to the current input image. Otherwise, the threshold distance increases again and the process for identifying additional images repeats. One reason for not increasing the search radius is that increasing the search radius forces the model to extrapolate (i.e., make predictions outside of the radius in which the model was trained to perform well) and, thus, will lead to larger errors.

In an embodiment, images in image database 110 are indexed based on position data of the images. The position data may indicate an absolute position or a relative position. The position data may be a single value or multiple values. Indexing images based on position data speeds up the candidate image selection process so that candidate image selector 150 does not have to scan each image in image database 110 for candidate images. For example, position data may be indicated by GPS coordinates. As another example, position data may comprise values for variables s and d, where (1) s indicates a distance, from a starting point, along a pre-defined path, curve, or trajectory, and (2) d indicates a distance from point s on the pre-defined path, where the line from s to d is perpendicular to a tangent of the pre-defined path at s. If images in image database 110 are indexed by s, then, given an estimated position $(s_e, d_e)$, candidate image selector 150 may use $s_e$ to identify one or more images whose s is within $s_e+T_s$ and $s_e-T_s$, where $T_s$ is a threshold distance value along the pre-defined path. If images in image database 110 are also indexed by d, then, for each image that candidate image selector 150 identifies based on $s_e$, candidate image selector 150 may determine whether that image has a d value that is between $d_e+T_d$ and $d_e-T_d$, where $T_d$ is a threshold lateral distance. $T_d$ may be increased or reduced if $d_e$ is near an edge or boundary of the pre-defined path for a moving object. One possible method for a quick nearest-neighbor lookup is a K-D tree, which is a binary tree in which each node represents a k-dimensional point. Every non-leaf node in the binary tree acts as a hyperplane, dividing the space into two partitions. This hyperplane is perpendicular to the chosen axis, which is associated with one of the K dimensions.

Example Candidate Image Selection Process

Figure 2:
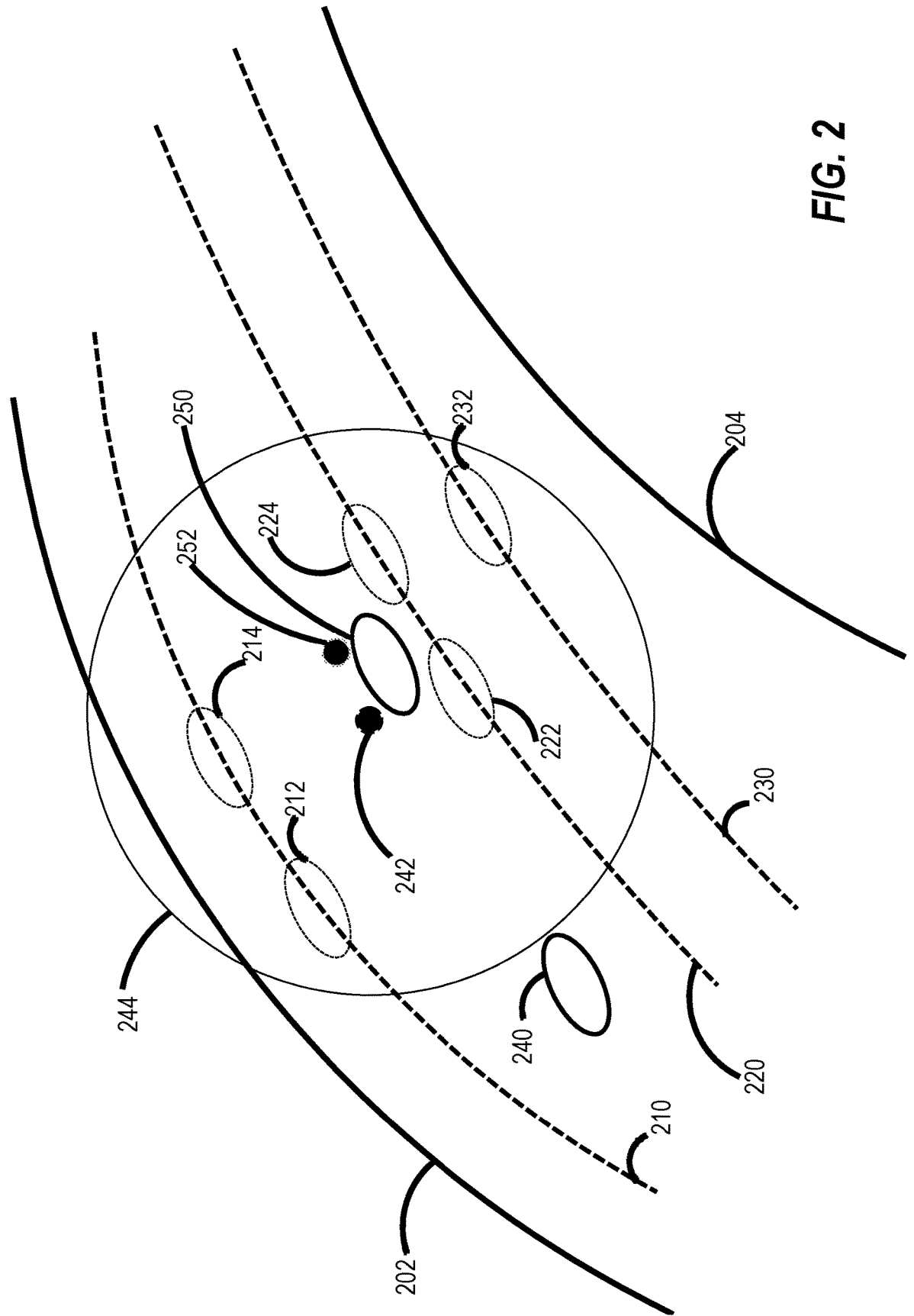
FIG. 2 is a diagram that depicts how candidate images may be selected, in an embodiment.

FIG. 2 is a diagram that depicts how candidate images are selected, in an embodiment. Lines 202 and 204 represent edges or boundaries that a moving object is not intended (or expected) to cross. Thus, a moving object is to remain between lines 202 and 204 through the object's movement. The area between lines 202 and 204 represents a portion of an overall track on which (or through which) a moving object may pass.

Lines 210-230 represent trajectories that one or more moving objects have traversed in the past. Digital cameras (attached to the one or more moving objects) generated digital images during those respective movements. ML model trainer 120 trains a neural network (e.g., ML model 130) using the generated digital images.

Objects 212 and 214 represent points on trajectory 210 where digital images were generated. Those images are associated with the respective locations or positions on trajectory 210. Thus, object 214 represents a time after the time represented by object 212. Digital images related to objects 212 and 214 come from the same video footage. Similarly, objects 222 and 224 represent points on trajectory 220 where digital images were generated. Those images are associated with the respective locations or positions on trajectory 220. Thus, object 224 represents a time after the time represented by object 222. Digital images related to objects 222 and 224 come from the same video footage, which is different than the video footage from which the digital images related to objects 212 and 214 originated. Similarly, object 232 represents a point on trajectory 230 where a digital image was generated. That image is associated with a particular location or position on trajectory 230 and originated from video footage that is different than the prior two video footages.

Object 240 represents a previous position for a moving object at time, t–1, which previous position may have been a predicted position using embodiments described herein. The value of t may be in seconds, milliseconds or some other time unit. Thus, the value of t–1 might not be literally t–1, but some value that is less than t and that indicates a time before time, t.

Point 242 represents an estimated position of the moving object at time, t. Candidate image selector 150 (or another component of localization system 100) determines the estimated position based on the previous position and one or more other factors, such as an estimated speed of the moving object and/or one or more other positions that are previous to time, t–1. Search area 244 represents an area (around point 242) for which candidate image selector 150 searches for candidate images, which were used to train the neural network. In this example, candidate image selector 150 selects five digital images, i.e., corresponding to objects 212, 214, 222, 224, and 232.

Object 250 represents the moving object at an actual location at time, t. Object 250 is the moving object whose position is being predicted based on a digital image that was generated at time, t. As described in more detail herein, ML model invoker 160 inputs this digital image (referred to as the "current" image) into the neural network (e.g., ML model 130), along with a candidate image, and the neural network outputs a predicted displacement, which is used to calculate an absolute position (e.g., latitude and longitude coordinates) or a relative position on the pre-defined path (e.g., s and d values). ML model invoker 160 repeats this process for each candidate image in the set of candidate image, resulting in a set of predicted positions. Thus, the current image is input multiple times into the neural network in order to obtain multiple predicted positions of object 250 at time, t.

A final predicted position 252 is determined based on the set of predicted positions. Such a determination may involve the performance of one or more operations, such as an aggregation operation, as described in more detail herein. In this example, final predicted position 252 is different than the actual position of the moving object, represented by object 250. This difference may be due to prediction error.

Invoking the ML Model

After candidate image selector 150 selects a set of candidate images, ML model invoker 160 invokes ML model 130 by passing, as inputs to ML model 130, a candidate image and the input image. This invocation repeats for each candidate image in the set of candidate images. Candidate image selector 150 (or another component of localization system 100) calls or triggers ML model invoker 160. Thus, candidate image selector 150 may pass, to ML model invoker 160 the input image and a single candidate image. Such passing may be performed while candidate image selector 150 is selecting candidate images given an input image. Alternatively, such passing may be performed only after candidate image selector 150 is finished selecting the set of candidate images.

Alternatively to passing a single pair of images at a time to ML model invoker 160 (which would invoke ML model 130 for each pair), candidate image selector 150 may pass the input image and the entire set of candidates images that candidate image selector 150 selects (i.e., given the input image) in a single call or transmission. In this scenario, ML model invoker 160 determines which of the images is the input image and which is the set of candidate images. Thereafter, for each candidate image in the set, ML model invoker 160 invokes ML model 130 by passing the candidate image and the input image.

Each invocation of ML model 130 results in output (of model output 162), from which a predicted position of the moving object is eventually determined, given the input image. Thus, if there are ten candidate images given an input image, ML model 130 is invoked ten times, ten instances of model output are generated, each instance comprising delta or displacement information.

Thus, each instance of model output 162 is a predicted displacement that comprises one or more values, such as a delta/displacement position value (which may comprise multiple values) and a delta/displacement angle. In order to generate a (intermediate) predicted position for an input image, ML model invoker 160 (or another component of localization system 100) adds the predicted displacement (which may be a positive value or a negative value) to the known position of the input candidate image that was used to generated the predicted displacement. For each invocation, ML model 130 may output multiple values, each corresponding to a different component or dimension of position data. For example, the output from a single invocation of ML model 130 is an s value, a d value, and a d value. Thereafter, the three predicted displacements are added to corresponding known position values of the input candidate image to calculate a predicted position (comprising three position values) associated with the input image.

Aggregation

In an embodiment, aggregator 170 performs an aggregation operation on multiple predicted positions that have been determined for an input image to generate a final predicted position. The aggregation operation may be a mean operation, a median operation, or a weighted average operation. If the latter, the weights applied to different predicted positions may vary depending on distance of the corresponding candidate images to the estimated position of the input image. For example, if a position of a first candidate image is closer to the estimated position than a position of a second candidate image, then the position of the first candidate image is given a higher weight than the position of the second candidate image.

In an embodiment, predicted deltas/displacements from ML model 130 are aggregated first. In this case, the aggregated delta/displacement would be a delta from the midpoint between all input candidate images. The absolute position of the midpoint can be calculated as an average of all absolute positions of the candidate images. Then the aggregated delta/displacement is added to the absolute position of the midpoint. However, embodiments hereinafter are described based on the approach where aggregation occurs after predicted deltas are, respectively, added to the absolute positions of their corresponding candidate images.

In the scenario where a predicted position comprises multiple values, then multiple aggregation operations are performed, one for each component of the position data. For example, an aggregation operation is performed for predicted s values, another aggregation operation (e.g., of the same type) for predicted d values, and another aggregation operation for predicted ψ values.

In a related embodiment, one or more predicted positions are not considered. For example, a predicted position may be associated with a confidence score that ML model 130 outputs along with the predicted position. If the confidence score is below a particular threshold, then the predicted position is not input to the aggregation operation.

A final predicted (and aggregated) position may be used in one or more ways. For example, localization system 100 may cause the final predicted position to be displayed on a computer screen, indicating a position or location of the moving object on a track or in 3D space. The computer screen may be a handheld device that includes controls for controlling the movement of the moving object. Alternatively, the computer screen may be part of a computer monitor that is viewed by multiple people. As another example, localization system 100 may transmit the final predicted position to an electronic receiver on the moving object, causing the moving object to make one or more adjustments based on the final predicted position, such as changing speed and/or changing direction. In this example, a goal of computer software controlling the moving object may be to maintain a particular speed, stay as close to the pre-defined path (e.g., the center of a track) as possible, and avoid obstacles, such as edges of the track and/or other moving objects. In the context of competitive racing, final predictions may be used for further analysis. For example, if video footage is collected for competitors in racing, the predictions may reveal their strategy, tactical choices, or specifics of a driving style of a particular driver that can further help beat that driver in a future race. The predicted data can also be used for analyzing known vehicles/drivers, to find new ways to optimize the route and/or speed of the vehicles.

The following formula is one way to generate a final predicted position given an input image i:

$$\hat{s}_i = \frac{1}{N}\sum_{j=1}^{N}\left(s_j - \hat{\Delta}s_{ij}\right)$$

where N is the number of candidate images in a set of candidate images, $s_j$ is a candidate image in the set of candidate images, $\Delta s_{ij}$ is the predicted displacement in s between the (unknown) position of input image i and the (known) position of the candidate image, $s_j$, and $\hat{s}_i$ is a final predicted position for the input image i. Similar formulas for d and u may be used, such as the $$\hat{d}_i = \frac{1}{N}\sum_{j=1}^{N}\left(d_j - \hat{\Delta}d_{ij}\right)$$

$$\hat{\psi}_i = \frac{1}{N}\sum_{j=1}^{N}\left(\psi_j - \hat{\Delta}\psi_{ij}\right)$$

Example Process

FIG. 3 is a flow diagram that depicts an example process 300 for predicting a position of a moving object, in an embodiment. Process 300 may be performed by different components of localization system 100.

At block 310, a digital image is received. The digital image is received after a neural network is trained using one or more machine learning techniques. The entity that performs process 300 may be the same as, or different than, the entity that trains the neural network. The digital image may have originated from a digital camera that is associated with (e.g., attached to) the moving object. The digital image may have been received within milliseconds of the digital camera generating the digital image.

At block 320, a set of candidate images is selected from a set of training images that were used to train the neural network. Block 320 may involve determining an expected position of the received digital image and then selecting the set of candidate images based on a threshold distance between the expected position of the digital image and an absolute position of each candidate image in the set of candidate images. Each training image is associated with an absolute position that was previously determined and associated with that training image.

If the number of candidate images that are initially selected is greater than a threshold number (e.g., ten), then a subset of those candidate images may be removed, such as candidate images that are associated with absolute positions that are the farthest away from the expected position. On the other hand, if the number of candidate images that are initially selected is less than the threshold number or is zero, then the threshold distance may be increased (e.g., by 20%) in order to identify one or more candidate images for selection.

The expected position of the received digital image may be determined in a number of ways, including based on the predicted position of each of one or more digital images that were received prior to the present received digital image. For example, if the distance between the last two predicted positions is N, then the expected position of the received digital image may be the predicted position of the most recent digital image plus N on the same line or arc as the last two predicted positions.

At block 330, a candidate image is selected from the set of candidate images. Block 330 may involve selecting the candidate image randomly from the set of candidate images. Alternatively, the set of candidate images may be first ordered by distance from nearest to farthest from the expected position of the received digital image and the nearest candidate image (that has not yet been processed in block 340) is selected.

At block 340, the selected candidate image and the received digital image are input to the trained neural network, which produces output, which is used to generate a predicted position of the moving object at a time corresponding to the received digital image. Block 340 may involve the trained neural network outputting a predicted displacement, which is added to the known position of the selected candidate image to compute the predicted position.

At block 350, the predicted position is added to a set of predicted positions. Initially, the set of predicted positions is empty. But each subsequent iteration of 350 relative to a particular received digital image adds another predicted position to a non-empty set of predicted positions.

At bock 360, it is determined whether there are more candidate images in the set of candidate images to select. If so, process 300 returns to block 330; otherwise, process 300 proceeds to block 370.

At block 370, the predicted positions in the set of predicted positions are aggregated to generate an aggregated position for the received digital image. Block 370 may involve averaging the predicted positions or computing a weighted average of the predicted positions, where the predicted positions that are associated with absolute positions that are closer to the expected position are weighted higher than the predicted positions that are associated with absolute positions that are farther away from the expected position.

At block 380, the aggregated position is associated with the moving object. Block 380 may involve storing the aggregated position with time data that indicates a current time or a time when localization system 100 received the digital image (received in block 310) or when that digital image was generated. Block 380 may also involve storing an object identifier that uniquely identifies the moving object.

After block 380, process 300 may return to block 310 in response to detecting another digital image to process.

Advantages

Existing solutions for solving the localization problem involve using visual SLAM or offline mapping and online localization-based methods. Such methods rely on finding features in input images/video, combining features into a map, and finding the current position of the camera in the map by correlating observed features with observed features in the map.

Embodiments are superior to such current approaches because embodiments use dense image data to localize a moving object whereas prior approaches use sparse feature data.

Embodiments are also superior to current approaches because embodiments offer accuracy levels to very few centimeters at every step. Experiments have shown that embodiments provide around 3-10 cm precision for vehicles moving as fast as 300 km/h (83 m/s) with cameras capturing their movement with FPS ranges of between 30 FPS and 60 FPS (2.5-1.2 m movement per frame), and possibly outside of this range as well. This level of precision for high speeds has been confirmed by over a hundred experiments using tens of videos captured from a camera mounted on a car, which has been driven at the aforementioned speeds on several closed loop roads with known geometry, as an example/test case. Current approaches only provide high accuracy localization intermittently when there is a unique correlation between the features in the current image and the map, and lose localization after a few seconds at such high speeds.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
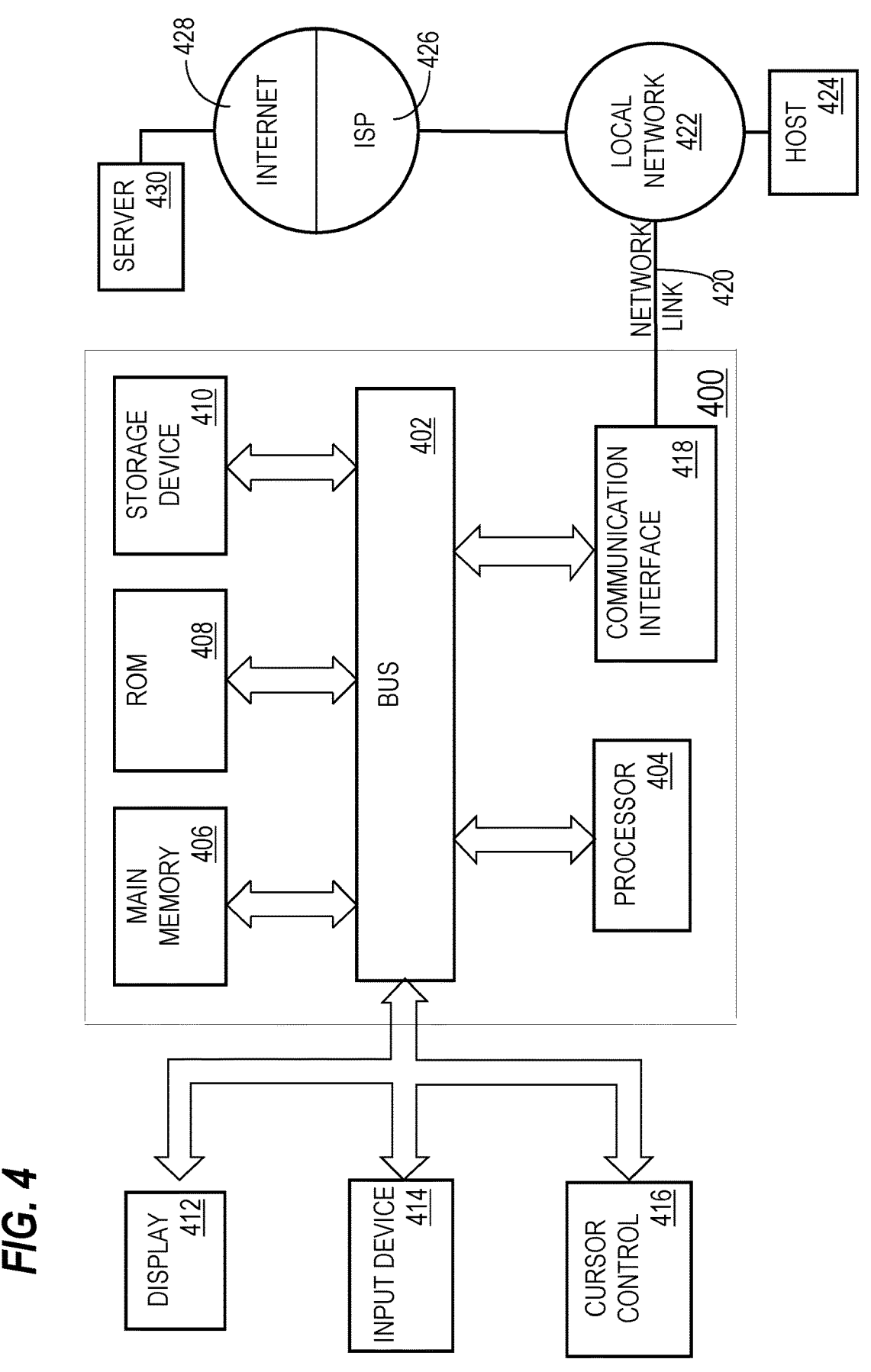
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or process-ing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
identifying a particular image that is associated with a moving object;
selecting a set of candidate images from a plurality of images that were used to train a neural network;
for each candidate image in the set of candidate images:
generating output from the neural network based on inputting the particular image and said each candidate image to the neural network;
determining a predicted position of the particular image based on the output and a position that is associated with said each candidate image;
adding the predicted position to a set of predicted positions;
aggregating the set of predicted positions to generate an aggregated position for the particular image;
associating the aggregated position with the moving object;
wherein the method is performed by one or more computing devices.

2. The method of claim 1, further comprising:
for each image in the plurality of images:
determining a position of said each image;
identifying a set of images whose positions are within a threshold distance from the position of said each image;
storing pair data that associates the set of images with said each image;
training the neural network based on the pair data associated with each image in the plurality of images.

3. The method of claim 1, wherein selecting the set of candidate images comprises:
determining an estimated position of the particular image;
selecting the set of candidate images based on a threshold distance between the estimated position of the particular image and a position of each candidate image in the set of candidate images.

4. The method of claim 3, wherein:
each image in the plurality of images is associated with position data that indicates a position of an object;
the method further comprising storing an index that indexes the plurality of images based on the position data associated with each image in the plurality of images;
wherein selecting the set of candidate images comprises using the estimated position to identify, in the index, the set of candidate images.

5. The method of claim 3, wherein determining the expected position of the particular image comprises determining the estimated position based on one or more predicted positions of one or more images that precede the particular image based on time.

6. The method of claim 3, wherein selecting the set of candidate images based on the threshold distance comprises:
selecting a plurality of candidate images based on the threshold distance;
determining a number of candidate images in the plurality of candidate images;
in response to determining that the number of candidate images is greater than a particular threshold number, selecting the set of candidate images whose respective positions are closest to the estimated position.

7. The method of claim 3, wherein selecting the set of candidate images based on the threshold distance comprises:
determining that no candidate images are within the threshold distance;
in response to determining that no candidate images are within the threshold distance, increasing the threshold distance to a greater threshold distance and including one or more candidate images within the greater threshold distance in the set of candidate images.

8. The method of claim 1, wherein:
the aggregated position comprises an s value and a d value;
the s value is a first distance, along a pre-defined path, from a starting point on the pre-defined path;
the d value is a second distance from a point, on the pre-defined path, that is indicated by the s value.

9. The method of claim 1, wherein the output comprises (1) a displacement of a position of said each candidate image and (2) a displacement of an angle of said each candidate image.

10. The method of claim 1, wherein aggregating the set of predicted positions comprises computing an average of the set of predicted positions.

11. The method of claim 1, further comprising:
for each candidate image in the set of candidate images, determining an estimated distance between a position of said each candidate image and a position of the particular image;
wherein aggregating the set of predicted positions comprises computing a weighted average of the set of predicted positions based on the estimated distance associated with each candidate image in the set of candidate images.

12. One or more non-transitory storage media storing instructions which, when executed by one or more computing devices, cause:
identifying a particular image that is associated with a moving object;
selecting a set of candidate images from a plurality of images that were used to train a neural network;
for each candidate image in the set of candidate images:
generating output from the neural network based on inputting the particular image and said each candidate image to the neural network;
determining a predicted position of the particular image based on the output and a position that is associated with said each candidate image;
adding the predicted position to a set of predicted positions;
aggregating the set of predicted positions to generate an aggregated position for the particular image;
associating the aggregated position with the moving object.

13. The one or more non-transitory storage media of claim 12, wherein the instructions, when executed by the one or more computing devices, further cause:
for each image in the plurality of images:
determining a position of said each image;
identifying a set of images whose positions are within a threshold distance from the position of said each image;
storing pair data that associates the set of images with said each image;
training the neural network based on the pair data associated with each image in the plurality of images.

14. The one or more non-transitory storage media of claim 12, wherein selecting the set of candidate images comprises:

determining an estimated position of the particular image;

selecting the set of candidate images based on a threshold distance between the estimated position of the particular image and a position of each candidate image in the set of candidate images.

15. The one or more non-transitory storage media of claim 14, wherein:

each image in the plurality of images is associated with position data that indicates a position of an object;

the instructions, when executed by the one or more computing devices, further cause storing an index that indexes the plurality of images based on the position data associated with each image in the plurality of images;

wherein selecting the set of candidate images comprises using the estimated position to identify, in the index, the set of candidate images.

16. The one or more non-transitory storage media of claim 14, wherein determining the expected position of the particular image comprises determining the estimated position based on one or more predicted positions of one or more images that precede the particular image based on time.

17. The one or more non-transitory storage media of claim 14, wherein selecting the set of candidate images based on the threshold distance comprises:

selecting a plurality of candidate images based on the threshold distance;

determining a number of candidate images in the plurality of candidate images;

in response to determining that the number of candidate images is greater than a particular threshold number, selecting the set of candidate images whose respective positions are closest to the estimated position.

18. The one or more non-transitory storage media of claim 14, wherein selecting the set of candidate images based on the threshold distance comprises:

determining that no candidate images are within the threshold distance;

in response to determining that no candidate images are within the threshold distance, increasing the threshold distance to a greater threshold distance and including one or more candidate images within the greater threshold distance in the set of candidate images.

19. The one or more non-transitory storage media of claim 12, wherein:

the aggregated position comprises an s value and a d value;

the s value is a first distance, along a pre-defined path, from a starting point on the pre-defined path;

the d value is a second distance from a point, on the pre-defined path, that is indicated by the s value.

20. The one or more non-transitory storage media of claim 12, wherein the output comprises (1) a displacement of a position of said each candidate image and (2) a displacement of an angle of said each candidate image.

* * * * *